United States Patent [19]
Brewer et al.

[11] Patent Number: 6,157,771
[45] Date of Patent: Dec. 5, 2000

[54] METHOD AND APPARATUS FOR SEEKING WITHIN AUDIOVISUAL FILES

[75] Inventors: Eric T. Brewer, Saratoga; Andrew Palfreyman, Sunnyvale, both of Calif.

[73] Assignee: FutureTel, Inc., Sunnyvale, Calif.

[21] Appl. No.: 08/947,646

[22] Filed: Oct. 9, 1997

Related U.S. Application Data

[60] Provisional application No. 60/030,955, Nov. 15, 1996.

[51] Int. Cl.$^7$ ................................................ H04N 5/76
[52] U.S. Cl. ................................ 386/69; 386/70; 386/111
[58] Field of Search .............................. 386/1, 33, 6–8, 386/45, 69–70, 111–112, 125–126; 369/32, 44.28; 360/72.1, 72.2, 72.3; H04N 5/76, 9/79, 5/92

[56] References Cited

U.S. PATENT DOCUMENTS

| | | | |
|---|---|---|---|
| 4,723,235 | 2/1988 | Yasuda et al. | 369/32 |
| 5,809,201 | 9/1998 | Nagasawa | 386/111 |
| 5,838,872 | 11/1998 | Kawara | 386/68 |
| 5,999,694 | 12/1999 | Yasuda et al. | 386/68 |
| 6,009,229 | 12/1999 | Kawamura | 386/68 |
| 6,035,092 | 3/2000 | Fujinami | 386/111 |
| 6,058,241 | 5/2000 | Kawamura et al. | 386/68 |

*Primary Examiner*—Thai Tran
*Attorney, Agent, or Firm*—Beyer Weaver & Thomas, LLP

[57] ABSTRACT

Disclosed are methods and apparatuses for seeking within audiovisual files. A seeking engine is implemented to efficiently locate target video frames without having to laboriously decode and index each and every video frame in an audiovisual file. Further, a seeking engine is capable of frame accurately determining the number of frames in a video file by identifying the last GOP header in the video file, and then identifying a last video frame in the file. The last video frame in the file is identified by reading each video frame's picture header (i.e., within the last GOP) and determining which picture header produces a larger temporal reference number. The video frame having the largest temporal number is therefore the last video frame in the video file. In addition, the seeking engine is capable of associating an identified video frame with a closest audio frame to complete an audio-to-video seek.

15 Claims, 10 Drawing Sheets

METHOD AND APPARATUS FOR SEEKING WITHIN AUDIOVISUAL FILES

CROSS REFERENCE TO RELATED APPLICATIONS

This application claims the benefit of U.S. provisional Application No. 60/030,955 filed on Nov. 15, 1996, the disclosure of which is incorporated herein by reference.

This application is related to the following U.S. patent applications: (1) U.S. patent application Ser. No. 08/947,771 filed on the same day as the instant application, naming Eric T. Brewer, Andrew Palfreyman and Thomas S. Gilley as inventors, and entitled "METHOD AND APPARATUS FOR EDITING VIDEO FILES"; (2) U.S. patent application Ser. No. 08/948,380 filed on the same day as the instant application, naming Eric T. Brewer, Andrew Palfreyman, and Greg C. Ames as inventors, and entitled "METHOD AND APPARATUS FOR EDITING VIDEO FILES"; (3) U.S. patent application Ser. No. 08/948,352 filed on the same day as the instant application, naming Eric T. Brewer, Andrew Palfreyman, and Thomas S. Gilley as inventors, and entitled "METHOD AND APPARATUS FOR CLIPPING VIDEO SEGMENTS FROM AN AUDIOVISUAL FILE"; (4) U.S. patent application Ser. No. 08/948,350 filed on the same day as the instant application, naming Eric T. Brewer, Andrew Palfreyman, and Thomas S. Gilley as inventors, and entitled "METHOD AND APPARATUS FOR STITCHING EDITED VIDEO SEGMENTS," and (5) U.S. patent application Ser. No. 08/947,844 filed on the same day as the instant application, naming Eric T. Brewer, Andrew Palfreyman, Greg C. Ames as inventors, and entitled "METHOD AND APPARATUS FOR COPYING AN AUDIOVISUAL SEGMENT." All above identified applications are hereby incorporated by reference.

BACKGROUND OF THE INVENTION

1. Field of the Invention

The present invention relates generally to methods for editing video files. More particularly, the invention relates to various methods and apparatuses for rapidly seeking to predetermined video frames within a multiplexed audiovisual file. In one aspect, methods and apparatuses for seeking to and accessing the data of a target frame by referencing a file byte off-set is disclosed.

2. Description of the Related Art

MPEG (motion pictures experts group) is a standard promulgated by the International Standards Organization (ISO) to provide a syntax for compactly representing digital video and audio signals. The syntax generally requires that a minimum number of rules be followed when bit streams are encoded so that a receiver of the encoded bit stream may unambiguously decode the received bit stream. As is well known to those skilled in the art, a bit stream will also include a "system" component in addition to the video and audio components. Generally speaking, the system component contains information required for combining and synchronizing each of the video and audio components into a single bit stream. Specifically, the system component allows audio/video synchronization to be realized at the decoder.

Since the initial unveiling of the first MPEG standard entitled MPEG-1, a second MPEG standard known as MPEG-2 was introduced. In general, MPEG-2 provided an improved syntax to enable a more efficient representation of broadcast video. By way of background, MPEG-1 was optimized to handle data at a rate of 1.5 Mbits/second and reconstruct about 30 video frames per second, with each frame having a resolution of 352 pixels by 240 lines (NTSC), or about 25 video frames per second, each frame having a resolution of 352 pixels by 288 lines (PAL). Therefore, decoded MPEG-1 video generally approximates the perceptual quality of consumer video tapes (VHS). In comparison, MPEG-2 is designed to represent CCIR 601-resolution video at data rates of 4.0 to 8.0 Mbits/second and provide a frame resolution of 720 pixels by 480 lines (NTSC), or 720 pixels by 576 lines (PAL). For simplicity, except where distinctions between the two versions of the MPEG standard exist, the term "MPEG," will be used to reference video and audio encoding and decoding algorithms promulgated in current as well as future versions.

Typically, a decoding process begins when an MPEG bit stream containing video, audio and system information is demultiplexed by a system decoder that is responsible for producing separate encoded video and audio bit streams that may subsequently be decoded by a video decoder and an audio decoder. Attention is now directed at the structure of an encoded video bit stream. Generally, an encoded MPEG video bit stream is organized in a distinguishable data structure hierarchy. At the highest level in the hierarchy is a "video sequence" which may include a sequence header, one or more groups of pictures (GOPs) and an end-of sequence code. GOPs are subsets of video sequences, and each GOP may include one or more pictures. As will be described below, GOPs are of particular importance because they allow access to a defined segment of a video sequence, although in certain cases, a GOP may be quite large.

Each picture within a GOP is then partitioned into several horizontal "slices" defined from left to right and top to bottom. The individual slices are in turn composed of one or more macroblocks which identify a square area of 16-by-16 pixels. As described in the MPEG standard, a macroblock includes four 8-by-8 pixel "luminance" components, and two 8-by-8 "chrominance" components (i.e., chroma red and chroma blue).

Because a large degree of pixel information is similar or identical between pictures within a GOP, the MPEG standard takes particular advantage of this temporal redundancy and represents selected pictures in terms of their differences from a particular reference picture. The MPEG standard defines three general types of encoded picture frames. The first type of frame is an intra-frame (I-frame). An I-frame is encoded using information contained in the frame itself and is not dependent on information contained in previous or future frames. As a result, an I-frame generally defines the starting point of a particular GOP in a sequence of frames.

A second type of frame is a predicted-frame (P-frame). P-frames are generally encoded using information contained in a previous I or P frame. As is well known in the art, P frames are known as forward predicted frames. The third type of frame is a bi-directional-frame (B-frame). B-frames are encoded based on information contained in both past and future frames, and are therefore known as bi-directionally predicted frames. Therefore, B-frames provide more compression that both I-frames and P-frames, and P-frames provide more compression than I-frames. Although the MPEG standard does not require that a particular number of B-frames be arranged between any I or P frames, most encoders select two B-frames between I and P frames. This design choice is based on factors such as amount of memory in the encoder and the characteristics and definition needed for the material being coded.

Although the MPEG standard defines a convenient syntax for compactly encoding video and audio bit steams, significant difficulties arise when a segment of an encoded bit stream is clipped out for use in a new bit stream. In particular, because P-frames use information from previous frames in the bit stream, and B frames use information from both previous and future frames, clips must be performed at I-frames. That is, the clipped segment must have an I-frame as a starting frame and a P or an I frame as the final frame in the clipped segment. Performing clips at I-frames therefore eliminates producing video clips that have beginning and ending frames which cannot be decoded without the reference frames contained in the original bit stream.

Unfortunately, typical encoded video bit streams have a larger number of P and B frames in between I-frames. Consequently, this disadvantageously limits the locations at which a clip may be performed, and therefore renders encoded MPEG bit streams unsuitable for the video editing industry which demands frame accurate precision.

A further disadvantage associated with conventional editing engines is an inability to seek to a target video frame without having to time consumingly read and decode each and every frame in a file. That is, before a seek to a particular video frame is performed, an editor must read and decode each video frame in the file to determine the temporal reference of each frame. Once each frame is read and decoded, a seek to the target frame may be performed. Unfortunately, a large majority of video files are of very large proportions. For example, a three hour video file can have up to about 324,000 video frames when the frame rate is 30 frames per second. As can be appreciated, reading and decoding each of the 324,000 video frames before a seek to a target frame is performed is extremely laborious and unsuitable for performing today's video editing tasks. In addition, conventional seeking algorithms must also read and decode a video file before the exact number of frames in a video file are ascertained.

In view of the foregoing, what is needed are methods and apparatuses for efficiently seeking to a target video frame within a video file without having to first laboriously read and decode each and every frame a video file.

SUMMARY OF THE INVENTION

To achieve the foregoing in accordance with the purpose of the present invention, methods and apparatuses for performing rapid and efficient seeks to a target video frame within an audiovisual file are disclosed. In one embodiment, a seeking engine of this invention initially determines an estimated position in bytes of the target frame within an audiovisual file. Once the estimated position has been determined in bytes, a predetermined number of seconds in bytes is subtracted from the estimated position to produce an estimate temporal position. The seeking engine then jumps to the estimate temporal position that is at least one group of pictures (GOP) header before the target video frame.

The seeking engine now proceeds to any GOP header lying ahead of the estimated temporal position. At each GOP header, the seeker determines whether a frame number derived from a time code of the current GOP header is greater than the target frame number. When the frame number derived from a time code of the GOP header is greater than the target frame number, the seeker backs up to a previously read and saved GOP header. At this point, the pervious GOP header will preferably contain the target frame. To identify the target frame, the seeker subtracts the frame number derived from the time code of the previous GOP header from the target frame number to generate a target temporal reference number within the GOP header.

The seeking engine now seeks to the target frame by moving to the target temporal reference number.

Advantageously, once the seeking engine identifies the target frame, a file byte off-set for the target frame is known and stored. The stored byte file off-set may then be used to efficiently seek to the target frame at anytime to access data contained in the target video frame.

In another embodiment, a seeker capable of frame accurately determining the number of video frames in an audiovisual file is disclosed. Initially, the seeker identifies and moves to an end of the audiovisual file. Once at the end, the seeker backs up a predetermined time to a location in the video file. Next, the seeker moves forward to identify any GOP headers, and any identified GOP header are saved. The seeker continues moving forward identifying and saving GOP headers until the end of the file is reached. At this point, the seeker backs up to a previously saved GOP header. Once at the previously saved header, the seeker reads each of a predetermined number of video frame picture headers associated with the previously saved GOP header to determine a temporal reference frame number for each video frame. As each of the predetermined number of video frame picture headers are read, it is determined whether a previous temporal reference frame number is greater than a current temporal reference frame number.

Based on this determination, the seeker disregards any current video frames having a temporal reference frame number lower than the previous temporal frame number. At this point, the last frame in the video file (which has an ascertainable frame number) has been identified as the frame having the highest temporal reference frame number in the previously saved GOP header. Advantageously, the seeker has accurately determined the number of video frames in the video file without having to laboriously read and decode each and every frame in the file.

Although the advantages are numerous, a particular advantage of this invention is that the seeking engine need not laboriously read, decode and index each and every video frame in an audiovisual file before being able to seek to a target video frame, or determine the number of video frames in an audiovisual file.

BRIEF DESCRIPTION OF THE DRAWINGS

The invention, together with further advantages thereof, may best be understood by reference to the following description taken in conjunction with the accompanying drawings.

DETAILED DESCRIPTION OF THE PREFERRED EMBODIMENTS

Broadly speaking, the present invention discloses methods and apparatuses for seeking within audiovisual files. A seeking engine is implemented to efficiently locate target video frames without having to laboriously decode and index each and every video frame in an audiovisual file. Further, a seeking engine is capable of frame accurately determining the number of frames in a video file by identifying the last GOP header in the video file, and then identifying a last video frame in the file. The last video frame in the file is identified by reading each video frame's picture header (i.e., within the last GOP) and determining which picture header produces a larger temporal reference number. The video frame having the largest temporal number is therefore the last video frame in the video file. In addition, the seeking engine is capable of associating an identified video frame with a closest audio frame to complete an audio-to-video seek.

For ease of illustration, the seeking engine of this invention will be described in relation to editing video files. In video editing, there is a general need to seek to target video frames in order to define the boundaries of an edited video segment within an audiovisual file. Accordingly, a brief overview of methods for editing video files is useful to appreciate the need for frame accurate and efficient seeking methods and apparatuses. Therefore, it should be understood that terms such as "clipping, copying, mark-in, and mark-out" all implement embodiments of the seeking engine to identify specific video frames. Once the target frames are identified, the data contents of the target frame may be rapidly accessed.

In one embodiment of this invention, a method for clipping a segment of video from an MPEG bit stream file and processing portions of the clipped segment to generate a bit stream segment that is independent of information contained in the original bit stream file is disclosed. Generally, the editing engine processes the clipped segment to produce the independent segment in two processing passes through an edit list of operators provided by an application requesting a particular editing operation. In the first processing pass, the editing engine preferably generates glue segments for the clipped segment based on the type of frames located at the beginning and at the end of the clipped segment. In the second processing pass, any glue segments generated in the first pass are stitched to any un-processed portion of the clipped segment. Once any glue segments and un-processed portions are stitched together in a correct time sequence, the stitched segment is sent to the application. Advantageously, the stitched segment will not require information contained in the original bit stream file in order to accurately decode the video frames.

Figure 1:
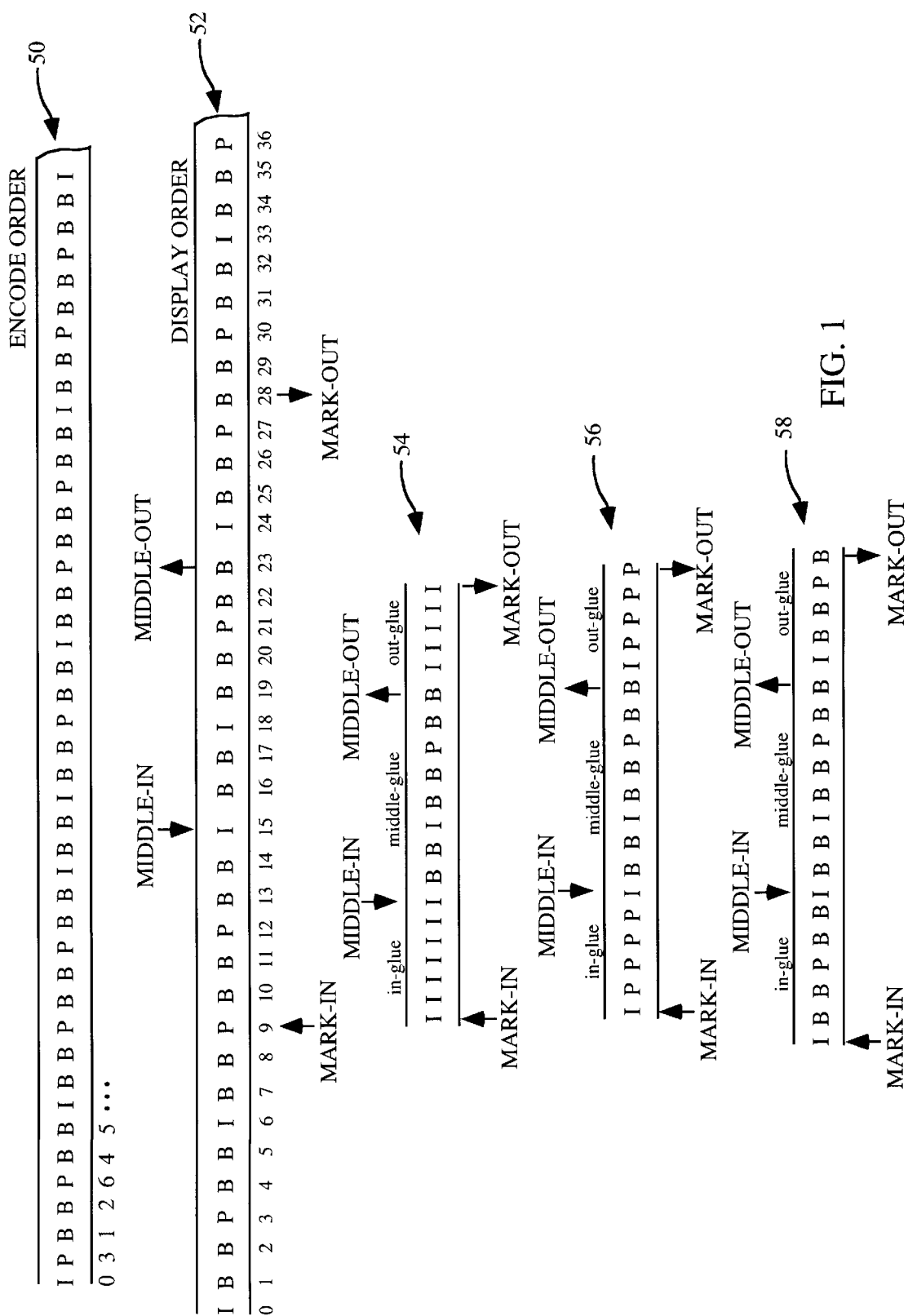
FIG. 1 shows a number of exemplary video frame sequences used to describe the processing steps associated editing video files in accordance with one embodiment of this invention.

FIG. 1 shows a number of exemplary video frame sequences used to describe the processing steps associated with generating video frame segments that are independent of frame information contained in a source file. An exemplary encode order stream 50 of video frames are presented to illustrate the order in which frames are encoded after being processed in accordance the MPEG standard format. By way of example, in encode order stream 50, the first frame is an I-frame which is followed by a P-frame, a B-frame, a B-frame, a P-frame, a B-frame, a B-frame, etc. Although the editing algorithm of this invention may process a sequence of frames in any suitable arrangement, the editing algorithm of this invention preferably processes frame sequences in a display order.

Thus, a frame stream arranged in temporal order from frame 0 to 36 identifies the order in which frames are processed in a display order stream 52. For comparison, the corresponding temporal order of the frames in encode order stream 50 are illustrated under the corresponding frames. Of course, it should be understood that display order stream 52 is merely exemplary, and other suitable display order streams may also be suitably processed in accordance with the teachings of this invention.

When a segment of video frames is clipped from display order stream 52, a mark-in location and a mark-out location is selected to mark the number of frames being clipped. By way of example, a mark-in location is selected at frame 9 which is a P-frame, and a mark-out location is identified as frame 28 which is a B-frame. Accordingly, the segment of frames clipped from display order stream 52 will include frames 9 through 28. Once the size of the clip is determined, if frame 9 is not an I frame, and frame 28 is not an I frame or a P frame, frames at the beginning of the clip will require information from past frames in the case of P-frame 9, and past and future frames in the case of B-frame 28. Consequently, frames 9 through 14 and frames 25 through 28, being predictive-type frames, will be unable to be decoded without acquiring sufficient context from frames remaining in display order stream 52.

In order to make the entire clipped segment of video frames decodable, video frames 9 through 14 and 25 through 28 will be processed to make the entire clipped segment decodable and independent of information contained in the original display order stream 52. By way of example, a "draft mode" processed segment 54 is shown after frames 9 through 14 and 25 through 28 were decoded and re-encoded into I-frames. For convenience, processed frames 9 through 14 will be referred to as "in-glue segments," and frames 24 through 28 will be referred to as "out-glue segments." Further, un-processed frames 15 through 23 will be referred to as "middle-glue segments."

In this embodiment, the in-glue and out-glue segments have been encoded into I-frames which eliminates having frames within the clipped segment referencing frames earlier than frame 9, and B-frames 25, 26, and 28 will also not require information contained in frames past frame 28. It should be understood that the re-encoded in-glue and out-glue segments may also be encoded into I and P combinations, where an I-frame begins both the in-glue segment and the out-glue segment as shown in clipped "I-P mode" segment 56. In yet another embodiment, the re-encoded in-glue and out-glue segments may be coded into I-P-B frames, such that an I frame begins both the in-glue segment and the out-glue segment as shown in clipped "I-P-B mode" segment 58. If segment 58 is implemented, the distance (i.e., number of frames) between each of the P frames is preferably determined. Further, the GOP size of each of the above described modes should also preferably be determined.

As will be described below in greater detail, once a segment has been selected for clipping between a mark-in and a mark-out location, if the mark-in location is not already an I-frame, then the most previous I-frame from the mark-in location is identified. In this example, frame 6 is the most previous I-frame in display order stream 52. In this manner, an MPEG decoder may decode I-frame 6 to acquire sufficient context to decode and re-encode frames in the in-glue segment which includes mark-in frame 9 and extends to one frame before a middle-in frame 15. By way of example, once the decoder acquires context by decoding I-frame 6 into a pixel bitmap, the process will proceed to decode and re-encode frames 9, 10, 11, 12, 13, and 14. In a similar fashion, frames 25 through 28 will also be individually decoded and re-encoded since the decoder attained sufficient context from I frame 24. Therefore, frames 25, 26, 27, and 28 are also re-encoded to generate an appropriate out-glue segment which begins with I-frame 24.

Figure 2:
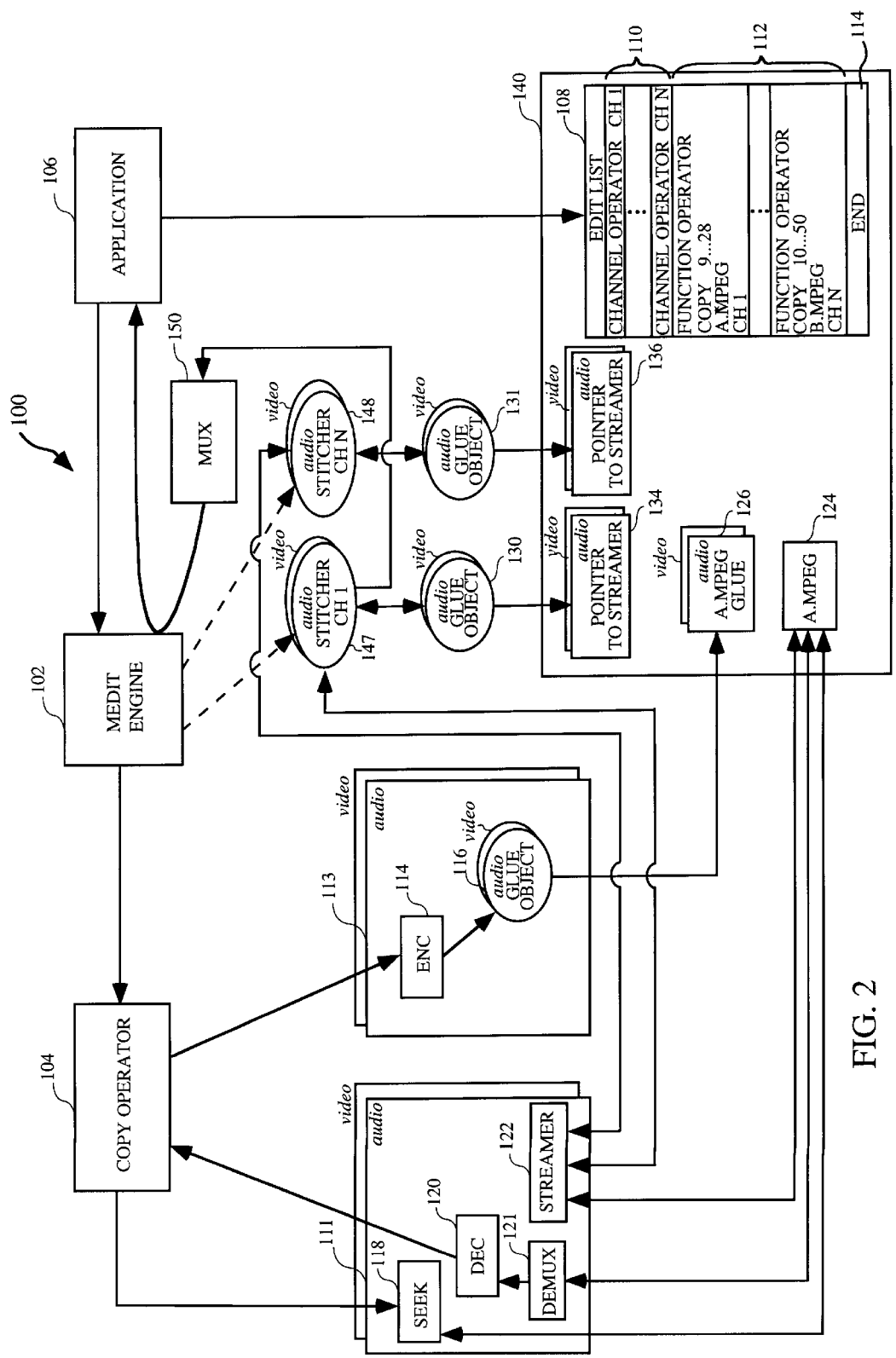
FIG. 2 is a data flow architecture used for editing video files in accordance with one embodiment of this invention.

FIG. 2 is a data flow architecture 100 used for editing a video file in accordance with one embodiment of this invention. As shown, a similar architecture (e.g., shown as shadowed objects) is used for editing the audio component of a file. A more detailed description of editing and synchronizing edited audiovisual files is provided in related U.S. patent application Ser. No. 08/948,380 which is hereby incorporated by reference.

In the embodiment shown, the data flow architecture 100 is preferably driven by an editing engine 102 (e.g., MEDIT editing engine) which is capable of performing a number of editing tasks. By way of example, such tasks may include copy operations requesting that a segment from a source or input stream file be copied for use in another file. Other suitable editing tasks may include fade operations, blend operations, morphing operations, titling operations, text annotation operations, etc. In general, MEDIT engine 102 is a dynamic engine that is capable of managing numerous editing tasks which may vary depending on the types of operators provided by an application requesting an editing task. It should therefore be understood that, MEDIT engine 102 may manage any number of operator types, including operators provided by future applications requesting sophisticated editing tasks.

As an overview, the following discussion will provide a general description of the processing steps taken by MEDIT engine 102 in performing editing tasks such as copying a segment of video from a source file. Generally, a copy operation is initiated when an application 106 requests that a copy operation be performed.

Initially, application 106 will provide MEDIT engine 102 with a suitable edit list 108 that includes a number of "channel operators" 110 identifying the number of channels requiring some type of editing, "function operators" 112 identifying the type of editing functions requested by application 106, and an "end operator" 114 identifying the end of an editing request. In the embodiment shown, the function operators 112 identify "copy" requests. By way of example, the first copy request identified in function operators 112 is a request for copying frames 9 through 28 in a file called A.MPEG for channel 1. As shown, there may be numerous other copy requests in function operators 112 leading up to a request for copying frames 10 through 25 in a file called B.MPEG for channel N.

Once MEDIT engine 102 receives edit list 108, the copy requests are processed in two identifiable passes through edit list 108. In a first pass, MEDIT engine 102 walks through edit list 108 identifying whether in-glue or out-glue segments are required for each copied segment. Of course, if both the mark-in and mark-out frames are I frames, then no in-glue or out-glue segments will be required. However, if either the mark-in frame is not an I frame, or the mark-out frame is not a P or an I frame, then glue segments will be generated for that copied segment. Once any glue segments are generated for the copied segments, the glue segments are stored in an appropriate storage medium 140. It should be understood that storage medium 140 may be any suitable storage medium such as a cache memory, a computer hard drive, floppy disk, or a remotely located storage medium connected by a suitable network.

In the second pass, the MEDIT engine 102 may make use of the previously generated glue segments by joining the glue portions with un-processed copied segments (i.e., middle glue) with the aid of a plurality of stitcher objects 147 and 148 that are created by MEDIT engine 102. As will be described in greater detail below, a stitcher object will be created for each channel in edit list 108, and each created stitcher object associated with a particular channel will be responsible for walking through edit list 108 and joining glue segments for its own channel (e.g., ignoring information associated with other channels).

In this manner, multiple stitcher objects may be created for each channel identified in edit list 108. In a preferred embodiment, each stitcher will be responsible for joining the particular glue segments in a proper time ordered manner, such that each generated segment is time stamped to generate an appropriate display order stream. Further, each created stitcher object uses a glue object such as glue objects 130 and 131 to pull the glue segments from the previously generated in-glue or out-glue files, or retrieve the middle glue from the original file by using pointers which identify the location of the middle-glue segment. By way of example, FIG. 1 shows an exemplary middle-glue segment that preferably includes frames 15 through 23. Once the stitched frame data is output as a program elementary stream (PES) to a multiplexer 150, the multiplexer 150 will pull PES data from all of the created stitchers and output the copied segments to application 106 through MEDIT 102.

To illustrate the overall data flow of FIG. 2, assume application 106 requests a copy operation of frames 9 through 28 from A.MPEG file 124 (i.e., display order stream 52 of FIG. 1) from channel 1. As MEDIT engine 102 walks through edit list 108 during a first pass, MEDIT engine 102 determines whether glue segments have already been generated and stored in a glue file during a previous editing request. Assuming that no glue segments already exist for a copy operation of frames 9 through 28 from A.MPEG file 124, MEDIT engine 102 will create copy operator 104 which creates a control operator 111 (e.g., direct-in object).

In this embodiment, control operator 111 uses a seek engine 118 to locate the appropriate video frames identified for copying in A.MPEG file 124. The algorithms associated with seeking to a particular target video frame are described in greater detailed below in FIGS. 3 through 8. Once the appropriate frames are located, a decoder will decode the most previous I-frame 6 to provide a decoder 120 with appropriate context for processing the frames within the in-glue segment. Once the decoder 120 has achieved an appropriate context, frame 9 is decoded by decoder 120 and transformed into a pixel bitmap which is sent to copy operator 104.

Copy operator 104 then sends the bitmap information to a control object 113 (e.g., direct-out object) created by copy operator 104 and having an encoder 114. Encoder 114 then calls a glue object 116 which stores re-encoded frames into an A.MPEG glue file 126. As shown, A.MPEG glue file 126 is stored in storage medium 140 which may be cache memory. Once frame 9 is re-encoded into an I-frame, frames 10 through 14 will be re-encoded as in a like manner in order to generate a "glue-in" file such as A.MPEG glue file 126.

It should be appreciated, that MEDIT engine 102 will generally create separate copy operators for each copy request in edit list 108. Therefore, the second copy operation request in the edit list (i.e., frames 10 through 50 from B.MPEG file, channel N) will be processed by a separate copy operator 104 which will in turn create a new control operator 111 for its own seeking and decoding functions, and a new control object 113 for encoding and transferring the generated glue frames to another glue file that may be stored within storage medium 140.

In one embodiment, execution of each copy operator may be processed by multiple processing units in a parallel format which advantageously expedites any editing requests identified in edit list., Further, parallel processing is facilitated since there is no set evaluation order in the edit list, and each editing operation may be performed independently of each other. In a further embodiment, multiple processing may be accomplished through the use of internet video servers. As is well known in the art, internet video servers may be used to simultaneously process editing requests in edit list 108.

Referring still to FIG. 2, once appropriate glue files are generated for each copy request in edit list 108, MEDIT engine 102 will walk through edit list 108 in a second pass to create stitcher objects such as stitcher objects 147 and 148 for each channel identified in edit list 108. Although only two stitcher objects are shown created for channel 1 and channel N, it should be understood that there may be any number of stitcher objects created depending on the number of channels identified in edit list 108. By way of example, in some embodiments, edit list 108 may contain stitcher objects for multiple channels up to about 4,000 video channels and about 8,000 audio channels under an MPEG-2 platform.

Once a stitcher object is created for each channel, each stitcher object 147 and 148 will preferably create glue objects 130 and 131. In this embodiment, each stitcher object will walk through the edit list searching for editing requests for its associated channel. By way of example, stitcher 147 will walk through edit list 108 to identify editing requests for channel 1, and likewise, stitcher 148 will walk through edit list 108 to identify editing operators for channel N, and so on. Once glue objects 130 and 131 are created, glue objects 130 will to provide each stitcher 147 and 148 with glue data that may have been generated during the first pass.

In this example, glue object 130 is charged with retrieving the various glue segments for the copied segment. By way of example, glue object 130 may retrieve glue data stored in A.MPEG glue file 126 and provide it to stitcher 147. Further, if any middle-glue data (i.e., unprocessed portion of the clipped segment) is required, glue object 130 will use pointers 134 to a streamer 122 controlled by control object 111. In this manner, glue object 130 will be able to retrieve the correct frames from the A.MPEG file 124. In this embodiment, middle-glue may be associated with frames 15 through 23 in display order stream 52 of FIG. 1. Therefore, as each stitcher 147 and 148 requests glue data, glue objects 130 and 131 will retrieve the data from the appropriate location. As each stitcher receives requested data in a time ordered manner, each stitcher will transfer PES data streams to a MUX unit 150 that multiplexes the received PES data streams and sends a single stream to application 106 through MEDIT 102.

Figure 3:
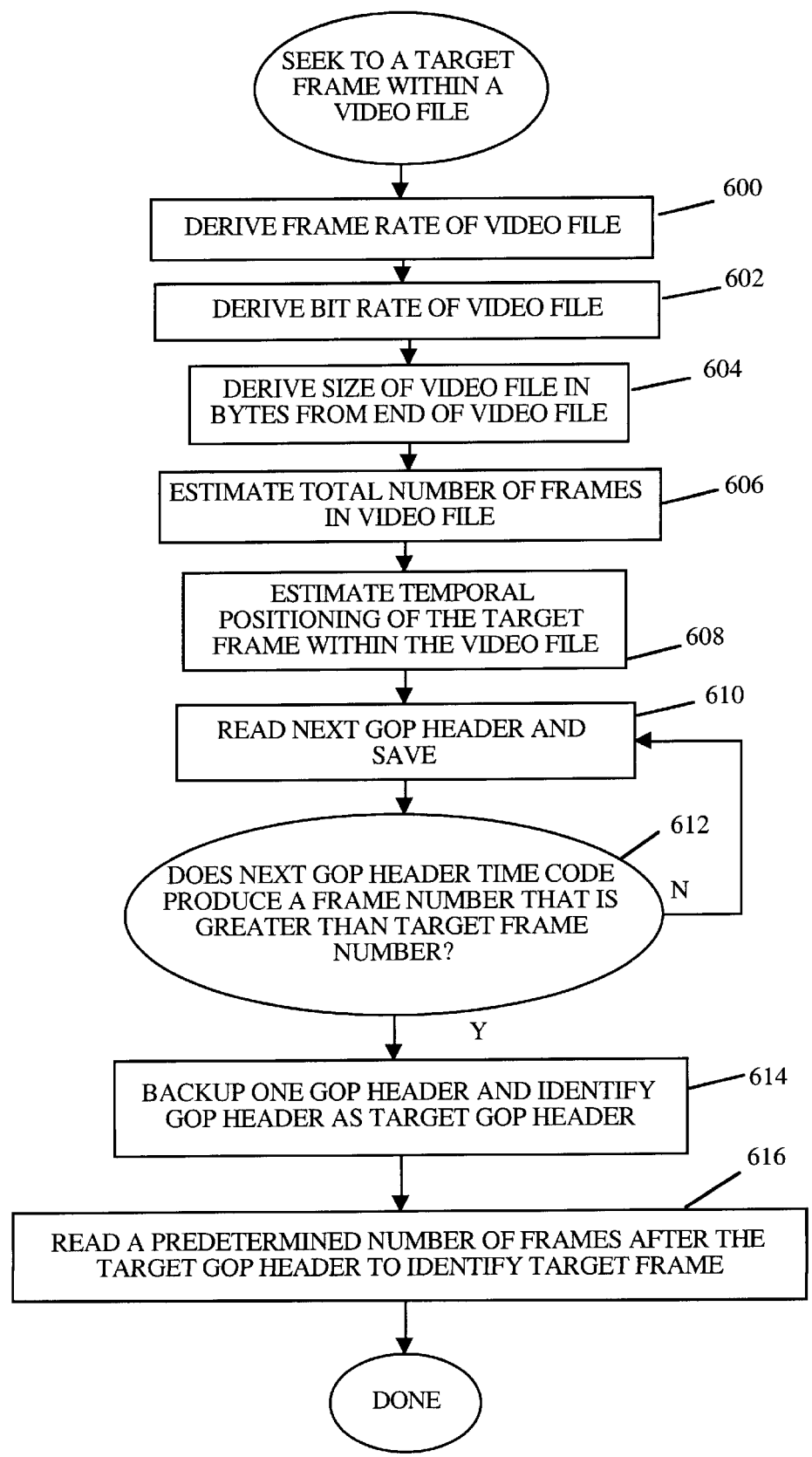
FIG. 3 is a flowchart diagram identifying the steps associated with seeking to a target frame within a video file in accordance with one embodiment of the present invention.

FIG. 3 is a flowchart describing the steps associated with seeking to a target frame with in a video file in accordance with one embodiment of the present invention. The method begins at a step 600 where a frame rate of the video file is derived. Generally, the frame rate of a video file is derived from the sequence header of the video portion of the multiplexed file, in particular, the header of the first video packet. As described above, the frame rate of a video file is about 30 video frames per second under NTSC, and about 25 video frames per second under PAL.

Once the frame rate of the video file is derived in step 600, the method proceeds to a step 602 where the bit rate of the file containing both video and audio is derived. As is well known in the art, the bit rate is derived from a pack header of a first pack in a multiplexed stream (e.g., the mux bit rate). Once the bit rate in bits per second are derived in step 602, the method proceeds to a step 604 where the size of the video file in "bytes" is determined from the end of the video file. By way of example, a suitable operating system is generally capable of ascertaining the size of read files in terms of bytes. Therefore, in step 604 the operating system will preferably provide the size of a multiplexed video/audio file.

After the size of the video/audio file is determined in step 604, the method proceeds to a step 606 where the total number of frames in the video file is estimated. By way of example, the number of frames may be estimated by "multiplying" the file size by the frame rate and then dividing the product by the bit rate.

TABLE 1

Number of Frames Estimate

S = file size (bytes)
B = bit rate (bytes/second)
R = frame rate (frames/second)
T = Estimate Total Number of frames (frames)
$T = S \times R/B$ Now that the total number of frames has been estimated in accordance with the above described equation in step 606, the method proceeds to a step 608 where the temporal positioning in terms of bytes is estimated for a target video frame within the video/audio file. To estimate the temporal positioning of a target video frame within a video file, the target video frame number is multiplied by the bit rate and then divided by the frame rate. Next, one second of bytes is subtracted from the derived temporal positioning in order to arrive at a location that is before the actual position of the target frame.

TABLE 2

Estimate Temporal Position (ETP)
of Target Video Frame

S = file size (bytes)
B = bit rate (bytes/second)
R = frame rate (frames/second)
T = Estimate Total Number of frames (frames)
F = Target Frame Number
$ETP = F \times S/T = F \times B/R - B = B(F-1)/R$ As can be appreciated, the estimate temporal position (ETP) of the video target frame is derived using the above described equations in step 698. The method now proceeds to a step 610 where the next GOP header is read and saved in temporary memory, e.g., cache memory or any suitable storage medium. By way of example, the next GOP header is preferably the GOP header that succeeds the estimated temporal position. Once the next GOP header is saved in step 610, the method proceeds to a decision step 612 where it is determined whether the next GOP header time code produces a frame number that is greater than the target frame number.

By way of example, if the target frame number is frame number 5525, and the GOP header time code produces a frame number of 5450, then the produced frame number is less than the target frame number. As is well known in the art, once a GOP header is read, a frame number may be produced by reading a SMPTE time code in the GOP header. As described in the MPEG document, any suitable public domain algorithm may be used to read and decode SMPTE times codes contained in GOP headers. For more information, reference may be made to the MPEG document "Coding of Moving Pictures and Associated Audio"—For digital storage media at up to about 1.5 Mbits/s (Part 2), 2-Annex E, IEC Standard, Publication 461, second edition, entitled "Time and Control Code For Video Tape Recorders" (1986). All parts of the entire MPEG document is incorporated by reference herein.

Therefore, if it is determined that the next GOP header time code produces a frame number that is not greater than the target frame number, the method will proceed back to step 610 where the next GOP header is read and saved as described above. Now, the method again proceeds to decision step 612 where it is again determined whether the next GOP header time code produces a frame number that is greater than the target frame number. On the other hand, if it is determined that the GOP header time code produces a frame number that is greater than the target frame number, the method will proceed to a step 614.

In step 614, the method will back-up one GOP header and identify that GOP header as a "target GOP header". In other words, the target GOP header defines the GOP that contains the target frame number. Further, since each previously read GOP header was saved, backing-up one frame merely reverts the method to the saved GOP. In this manner, the GOP header time code will produce a frame number that is the target frame itself, or is at least not greater than the target frame number.

After the method backs up one GOP header and identifies the GOP header as the target GOP header in step 614, the method will proceed to a step 616 where a predetermined number of frames within the target GOP are read in order to seek to the target frame number. Once a predetermined number of target frames are read, the target frame is identified, and the method will be done.

Figure 4:
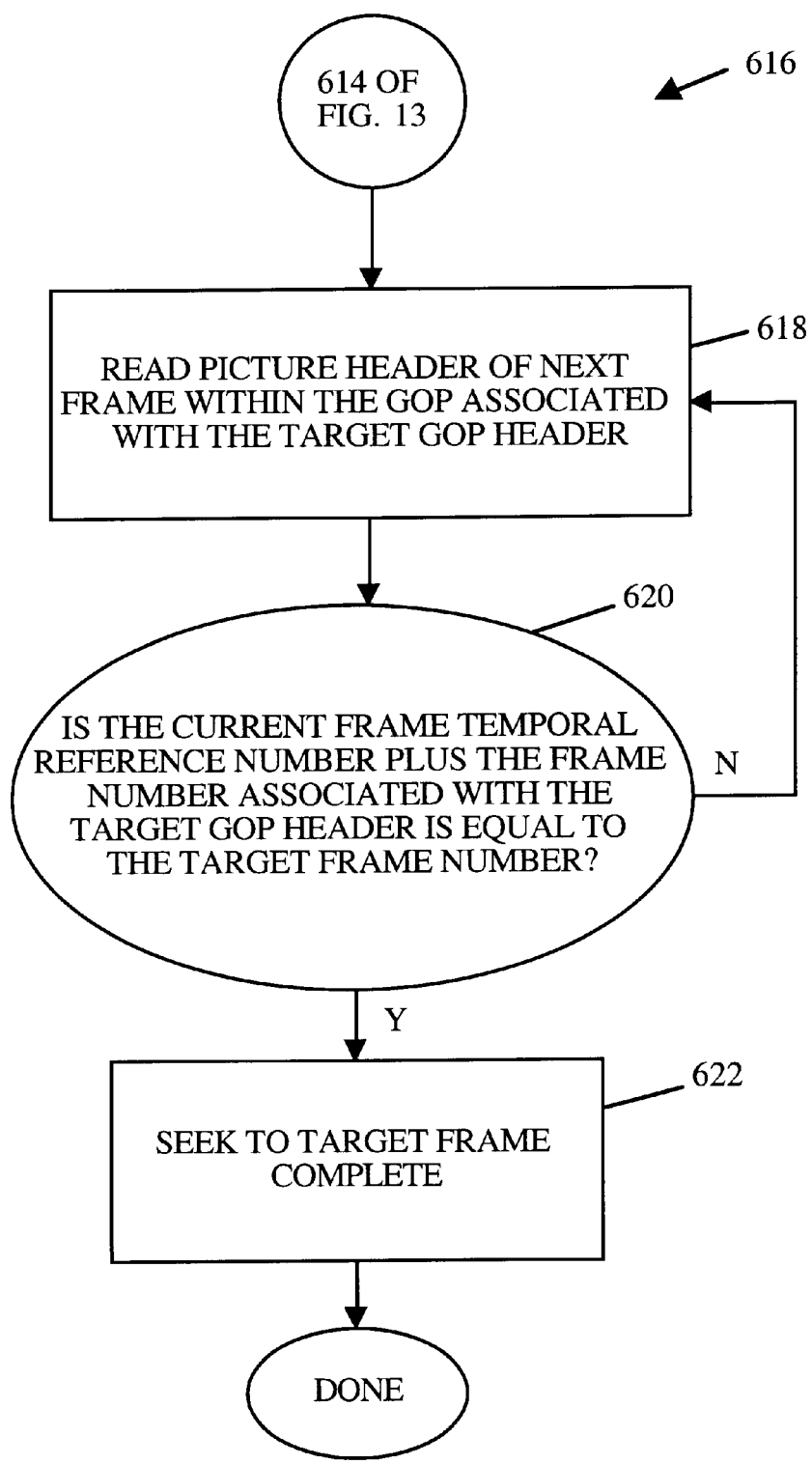
FIG. 4 is a more detailed description of the method steps associated with reading a predetermined number of frames in accordance with one embodiment of the present invention.

FIG. 4 is a more detailed description of the method steps associated with reading a predetermined number of frames within the target GOP to seek to the target frame number. The method begins at a step 618 where the picture header of the next frame within the target group of pictures (GOP) is read. As described above, a GOP header generally defines the beginning of a number of video frames beginning with an I frame. Once the picture header for the first frame within the target GOP is read, the method will proceed to a decision step 620 where it is determined whether the current frame's temporal reference number plus the frame number derived from the target GOP header (e.g., SMPTE time code) is equal to the target frame number.

If it is determined that the current frame temporal reference number plus the frame number derived from the target GOP header is not equal to the target frame number, the method will again proceed to step 618 where the next frame's picture header is read and decoded. Once the next frame's picture header is read and decoded in step 618, the method will again proceed to decision step 620. Once again, in decision step 620, it is determined whether the current frame temporal reference number plus the frame number derived from the target GOP header is equal to the target frame number. If this condition is met, the method will proceed to a step 622 where the target frame has been identified and the method for seeking to a target frame is done.

Once the target frame has been identified, a file byte off-set for the target frame is known and stored. As used herein, a file byte off-set is defined as the location of a target frame in a video file with respect to the beginning of a file. That is, the target frame may be located at a "file byte off-set" that is a determined number of bytes into the file from the beginning of a file which is set to "0" bytes (i.e., no off-set). Advantageously, since the file off-set is known for the target frame, the contents of the target frame can be rapidly accessed and read when needed by merely seeking to the stored file byte off-set of the target frame.

Figure 5:
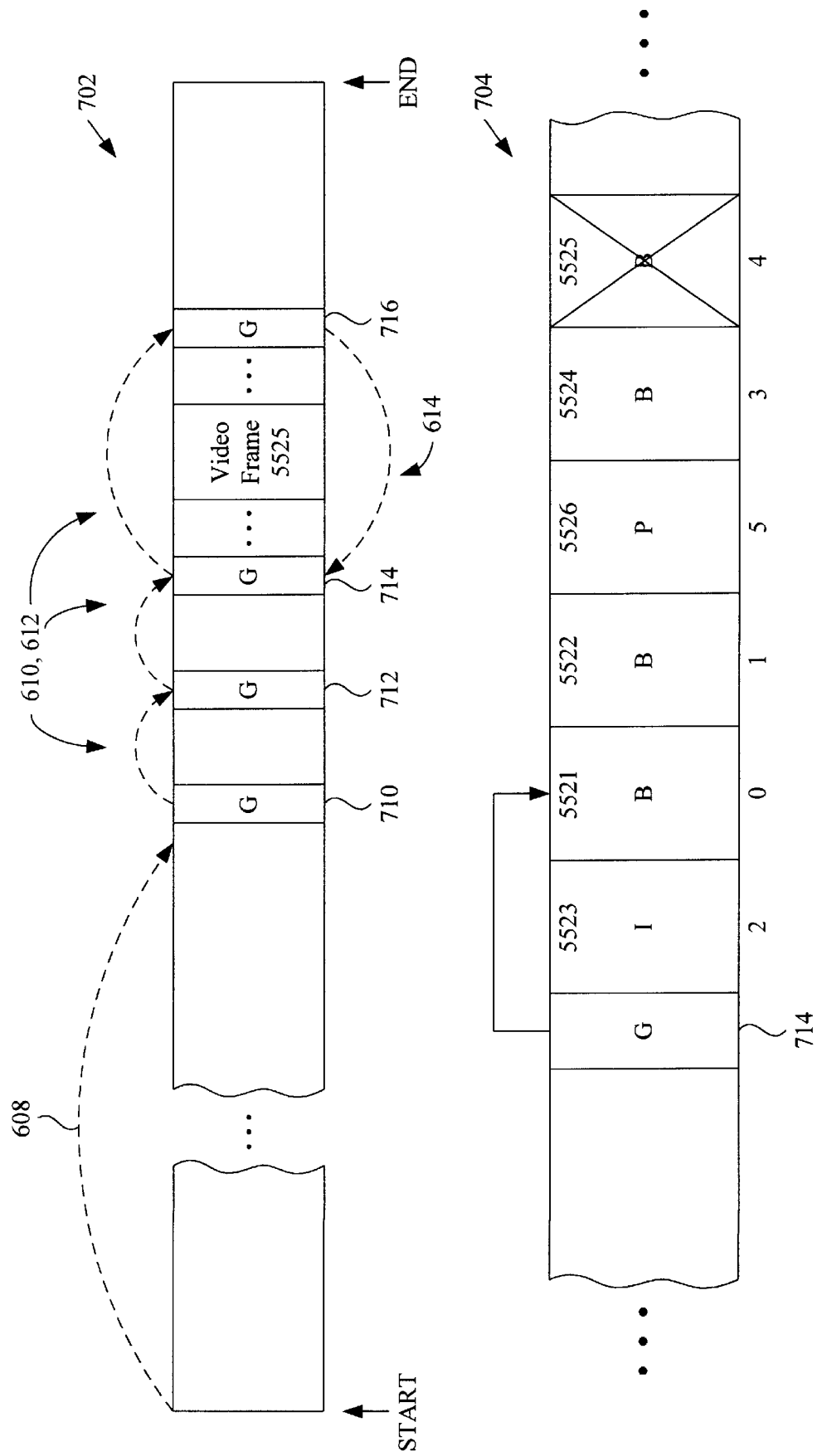
FIG. 5 is a diagrammatic representation of an exemplary video file in accordance with one embodiment of the present invention.

FIG. 5 is a diagrammatic representation of an exemplary video file 702 having a start point and an end point, in accordance with one embodiment of the present invention. Initially, a seeker will jump to the estimated temporal position in the video/audio file as described in step 608 of FIG. 3. Once a jump has been completed to the estimated position in the video file as shown in FIG. 5, the method determines whether the frame number derived from a GOP header 710 is greater than the target frame (e.g., target frame 5525). In this example, GOP header 710 does not produce a video frame number that is greater than the target frame 5525.

Accordingly, the method will proceed to a next GOP header 712 where it is again determined whether the GOP header time code produces a frame number that is greater than the exemplary target frame 5525. For illustration purposes, it is again determined that the frame number derived from GOP header 712 is not greater than the video target frame number 5525. Once again, the method proceeds to a next GOP header 714 that still does not produce a frame number that is greater than the target frame. The method now proceeds to a next GOP header 716. At this point, it is finally determined that the GOP header time code produces a frame number that is greater than the target video frame 5525. In accordance with one embodiment of this invention, the method will now back up to the previously save GOP header 714 as described in step 614 of FIG. 3.

As shown in a magnification 704 of FIG. 5, GOP header 714 is followed by a plurality of video frames. The plurality of video frames therefore defines a group of pictures having an I frame 5523 (temporal reference number 2), a B frame 5521 (temporal reference number 0), a B frame 5522 (temporal reference 1), a P frame 5526 (temporal reference 5), a B frame 5524 (temporal reference number 3), and a B frame 5525 (temporal reference number 4). As described in the MPEG standard, the frame number derived the GOP header 714 SMPTE time code is B frame 5521 which is pictorially indicated by an arrow. It should be appreciated that the video file is in "encode order" while the various seeking operations are performed. However, the various temporal reference frames identify what the appropriate "display order" should be.

Since the frame number derived from the GOP header 714 is frame number 5521, the seeker is four frames away from the target frame 5525. Therefore, the seeker proceeds to identify the fourth temporal reference frame. In this example, the fourth temporal reference frame will advantageously be "target frame 5525." As shown in magnification 704 of FIG. 5, the target frame 5525 is a B frame.

Figure 6A:
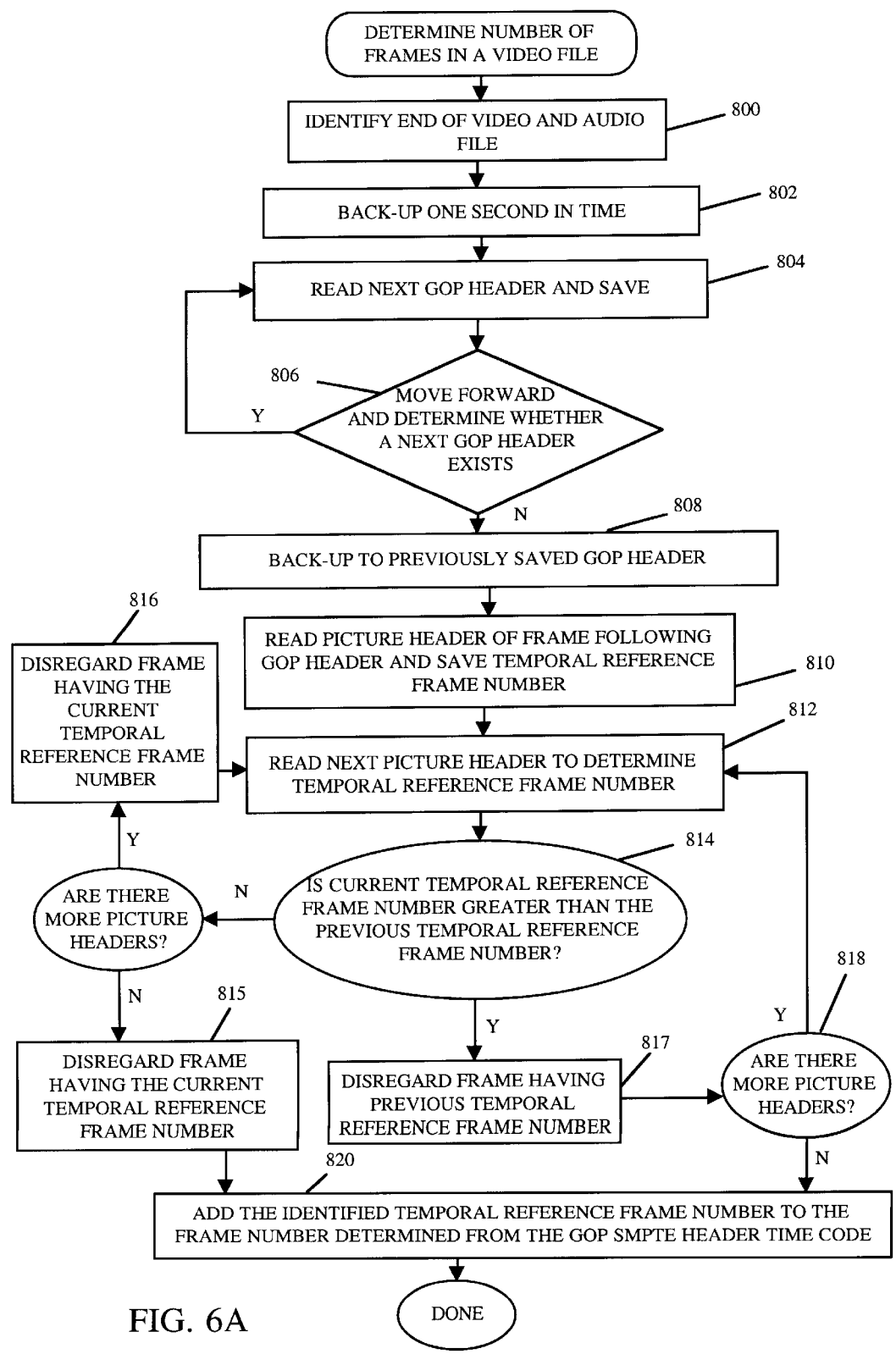
FIG. 6A is a flowchart diagram of the method steps for efficiently determining the number of video frames in a multiplexed audiovisual file in accordance with one embodiment of the present invention.

FIG. 6A is a flowchart diagram of the method steps for efficiently determining the number of video frames in a multiplexed video/audio file in accordance with one embodiment of the present invention. The method begins at a step 800 where the end of the video and audio file is identified in bytes. As described above, any suitable operating system is generally capable of reading and determining the end of an average file in terms of length. Once the end of the video file is determined in step 800, the method proceeds to a step 802 where the seeker backs-up one second in bytes. For ease of explanation, FIG. 6B which shows an exemplary file 850 having a start time and end time will be described concurrently with the flowchart diagram of FIG. 6A.

As described above, the seeking engine will preferably back-up one second in bytes from the end of exemplary file 850 and land at a point 851. Once the seeking engine has backed up one second in bytes, the method will proceed to a step 804 where the next GOP header is read and saved. By way of example, the next GOP header is shown as a GOP header 854 in exemplary file 850.

Figure 6B:
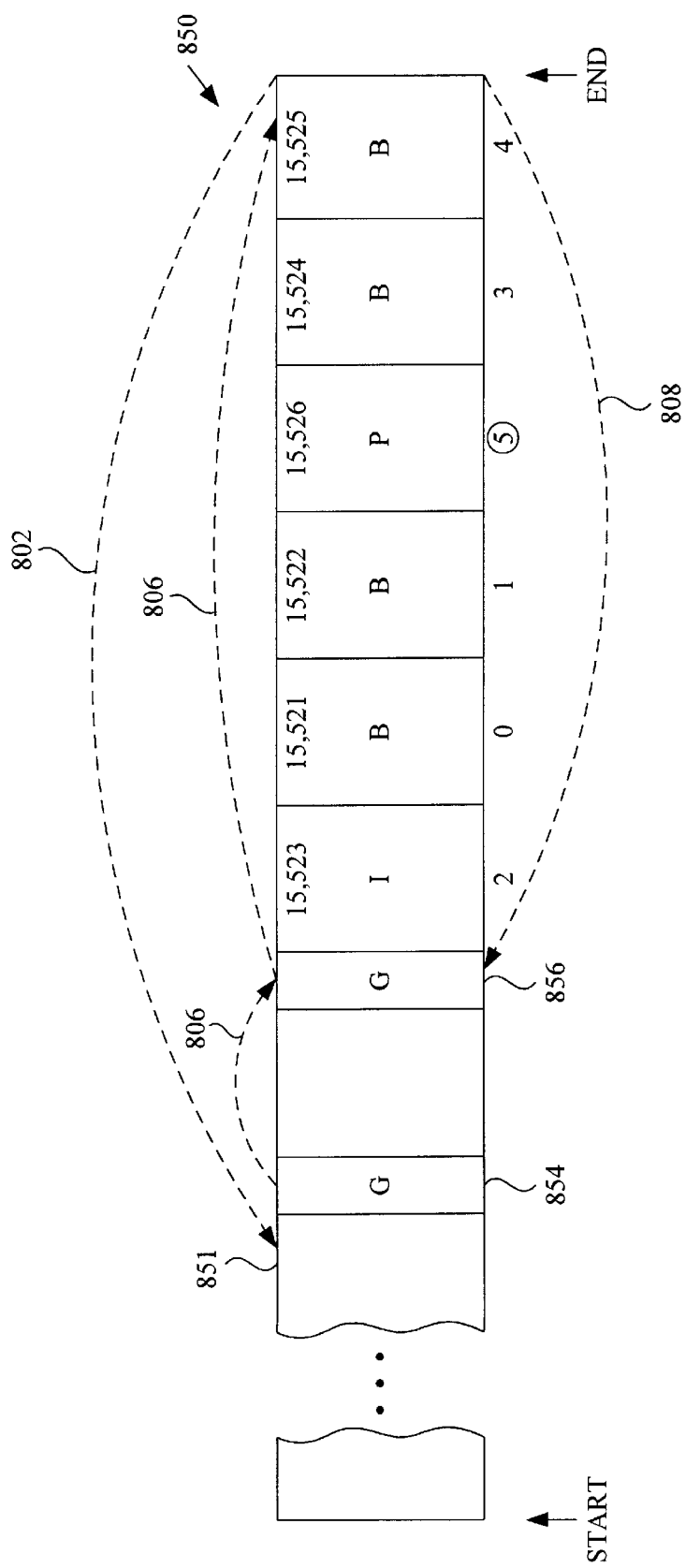
FIG. 6B is an exemplary video file in accordance with one embodiment of the present invention.

The method now proceeds to a decision step 806 where the seeking engine moves forward and determines whether there is a next GOP header in the video file. Since exemplary file 850 does contain a next GOP header 856, the seeking engine will proceed to the next GOP header 856 where it is read and saved appropriately as shown in FIG. 6B. Next, the method again proceeds to decision step 806 where the seeking engine moves forward and determines whether there is a next GOP header in the video file.

Since there are no more GOP headers in the video file, the method will proceed to a step 808 where the seeker engine will back up to the previously saved GOP header 856. At this point, the seeking engine has identified the last GOP header in the file. Accordingly, the last video frame in the file will preferably be located within GOP 856. Once the seeker is at the previously saved GOP header 856 as shown in FIG. 6B, the method will proceed to a step 810 where a picture header of each frame following GOP header 856 is read. In this manner, the temporal reference frame number of each read picture header is determined and saved.

In the exemplary file 850 of FIG. 6B, the next frame is an "I" frame 15,523 having a temporal reference number "2" which is saved in temporary memory. The method will proceed to a step 812 where the next frame's picture header is read to determine the temporal reference frame number. As shown in FIG. 6B, the next frame is a "B" frame 15,521 having a temporal reference number "0" which is saved. At this point, we have saved a "previous" temporal reference number "2" and a "current" temporal reference number "0."

The method now proceeds to a decision step 814 where it is determined whether the "current" temporal reference frame number "0" is greater than the "previous" temporal reference frame number "2." Because the current temporal reference number "0" is not greater than the previous temporal reference number "2", the method will proceed to a step 815 where it is determined whether there are more picture headers. Since there are more picture headers, the method will proceed to a step 816 where the frame having the current temporal reference frame number "0" is disregarded.

The method again proceed to step 812 where the next picture header is read to determine its temporal reference frame number. The next frame is a "B" frame 15,522 having a temporal reference number "1." At this point, the "current" temporal reference number is "1," and the "previous" temporal reference number is "2." The method now proceeds to decision step 814 where it is determined whether the "current" temporal reference frame number "1" is greater than the previous temporal reference frame number "2." Since the current temporal reference frame number is not greater than the previous temporal reference frame number, the method will again proceed to a step 815 where it is determined whether there are more picture headers.

Because there are more picture headers, the method will again proceed to a step 816. As described above, the current temporal reference frame number is disregarded, and the method proceeds to step 812. In step 812, the method proceeds to read the picture header of a "P" frame 15,526 having a temporal reference number "5." At this point, the "current" temporal reference number is "5" and the "previous" temporal reference number is "2."

Once again, the method will proceed to step 814 where it is determined whether the current temporal reference number "5" is greater than the "previous" temporal reference number "2." Since it is greater, the method will proceed to a step 817 where the frame having the previous temporal reference number "2" is disregarded. That is, since the current temporal reference number "5" is greater than the previous temporal reference number "2," the seeking engine is closer to identifying the last displayed frame in the file, which of course, indicates the exact total number of video frames contained within the file. Although "P" frame 15,526 is the last displayable frame in the file, the seeker must confirm this by reading the remaining frames as described above.

The method therefore proceeds to a decision step 818 where it is determined whether there are more picture headers. Since there are, the method will proceed to step 812 where the next picture header is read to determine the temporal reference frame number. As shown in FIG. 6B, the next frame is a "B" frame 15,524 which has a temporal reference frame number of "3." Accordingly, the "current" temporal reference frame number is "3" and the "previous" temporal reference frame number is "5."

The method now proceeds to step 814 where it is determined whether the current temporal reference frame number is greater than the previous temporal reference frame number. In this case, the current temporal reference frame number "3" is not greater than the previous temporal reference frame number "5," the method will proceed to a step 815 where it is determined whether there are more picture headers. Since there are more picture headers, the method will proceed to a step 816 where the current temporal reference frame number "3" is disregarded. The method now proceeds to step 812 where the next picture header is read to determine the temporal reference frame number.

As shown in FIG. 6B, the next frame is a "B" frame 15,525 which has a temporal reference frame number of "4." Accordingly, the "current" temporal reference frame number is "4" and the "previous" temporal reference frame number is "5." The method now proceeds to step 814 where it is determined whether the current temporal reference frame number is greater than the previous temporal reference frame number. In this case, the current temporal reference frame number "4" is not greater than the previous temporal reference frame number "5." The method now proceeds to step 815 where it is determined whether there are more picture headers.

In the example of FIG. 6B, there are no more picture headers after "B" frame 15,525, and the method proceeds to a step 819 where the frame having the "current" temporal reference frame number "4" is disregarded. At this point, the only remaining frame is "P" frame 15,526 having the previous temporal reference frame number "5." The seeker has now ascertained the frame having a picture header with the largest temporal reference number, while disregarding any frames having lower temporal reference frame numbers.

The method now proceeds to a step 820 where the identified temporal reference frame number is added to the frame number determined from the GOP header SMPTE time code. As described above, an absolute frame number can be determined from the GOP header SMPTE time code using the aforementioned public domain algorithm referenced in the MPEG document and incorporated herein by reference. As described in the MPEG document, the absolute frame number derived will be "B" frame 15,521.

Once the frame number is identified, it is added to the temporal frame number "5" identified above. Accordingly, the last frame number will be (15,521+5=15,526). At this point, the seeker has correctly identified the "P" frame as the last frame having a frame number of "15,526." Advantageously, the seeker has accurately determined the number of video frames in the exemplary file 850 of FIG. 6B without having to laboriously read and decode each and every frame in the file.

Figure 7:
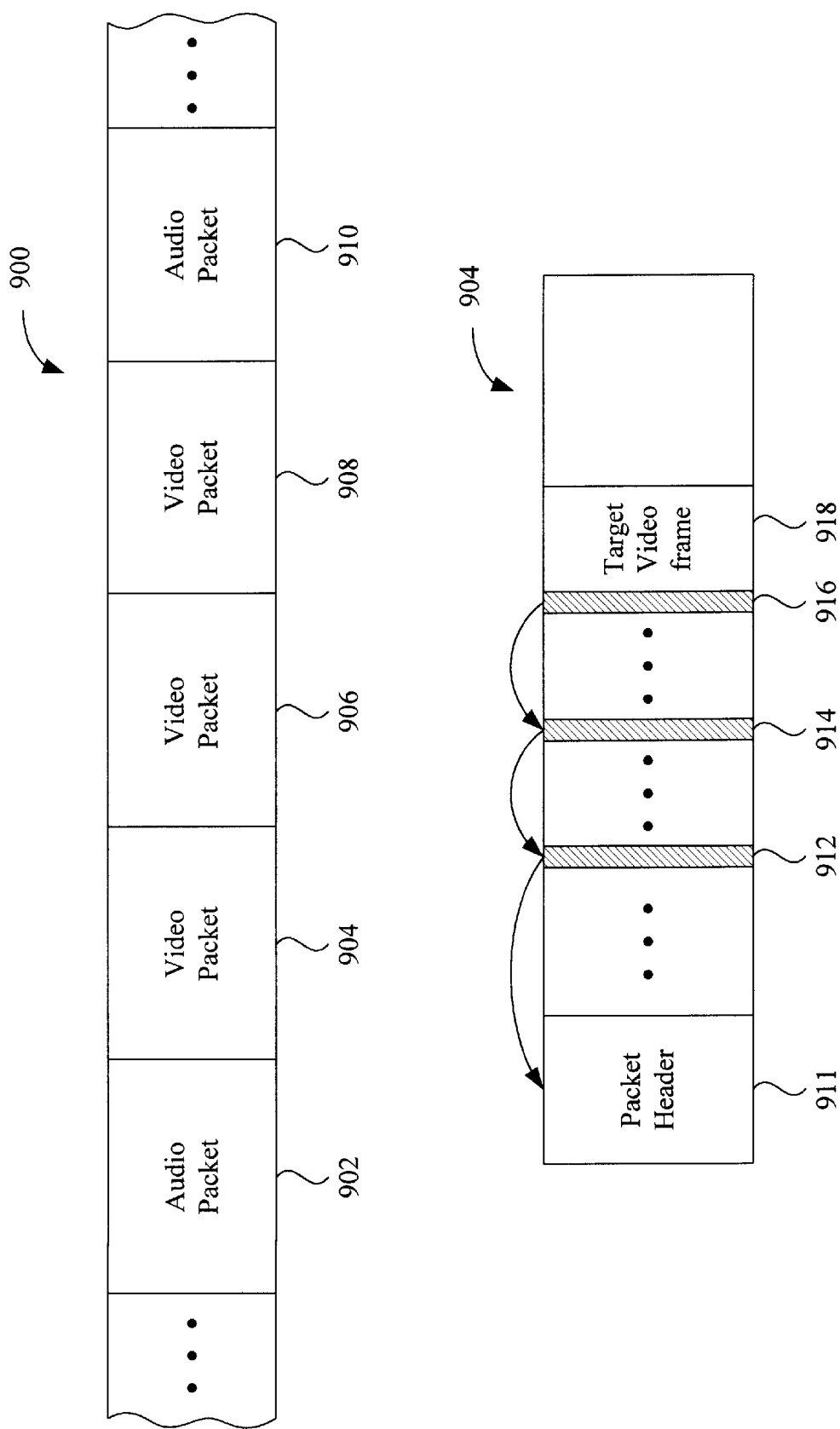
FIG. 7 is a diagrammatic representation of a system stream having a plurality of audio and video packets in accordance with one embodiment of the present invention.

FIG. 7 is a diagrammatic representation of a system stream 900 having a plurality of audio and video packets in accordance with one embodiment of the present invention. FIG. 7 will be used to pictorially illustrate the method steps described in FIG. 8 for determining the location of a target video frame 918 within system stream 900 in "system clocks." Once the location of the target video frame 918 is determined, the closest audio frame can be identified, thereby completing an "audio-to-video" seek.

As described in the MPEG document, a timing mechanism is provided for ensuring that both the video and audio components a system stream 900 are synchronized. Generally speaking, the MPEG standard identifies both a system clock reference (SCR) and presentation time stamps (PTS) coded using 33 bits for maintaining synchronization and ensuring appropriate playback. Further, the system clock generally runs at about 90 kHz.

For completeness, FIG. 7 shows an audio packet 902 positioned at the leftmost part of the system stream which is followed by a video packet 904, followed by a video packet 906, followed by another video packet 908, and then an audio packet 910. Also shown is a magnification of video packet 904 identifying a packet header 911, a plurality of picture headers 912, 914, and 916. In this example, picture header 916 is the picture header of the target video frame 918.

Figure 8:
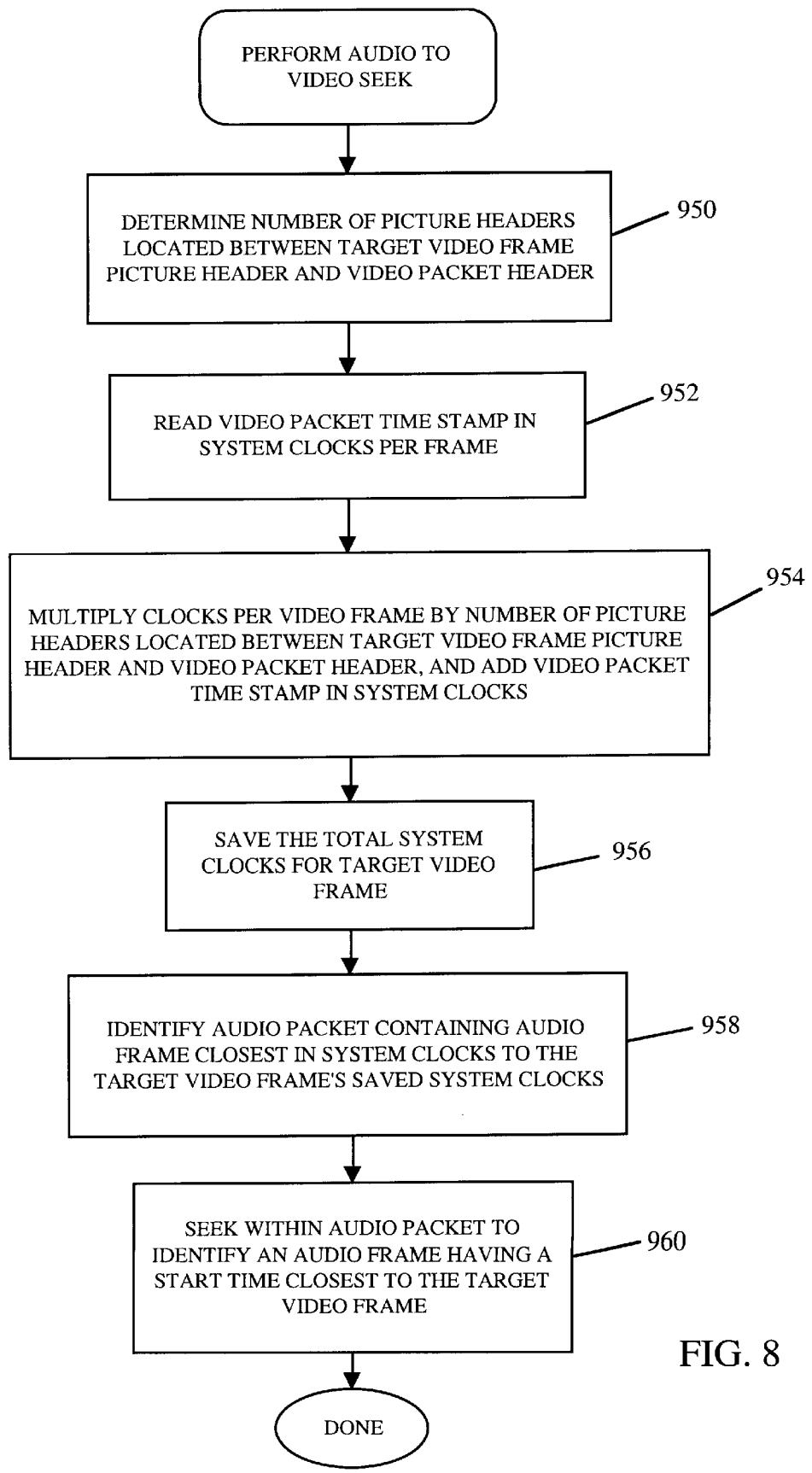
FIG. 8 is a flowchart diagram of the method steps associated with performing an audio-to-video seek in accordance with one embodiment of the present invention.

The method for performing an audio-to-video seek as described in the flowchart of FIG. 8 begins at a step 950 where the number of picture headers located between a target video frame picture header 916 and video packet header 911 is determined. In this example, it is determined what number of picture headers are two "2." That is, picture headers 912, and 914. Of course, if there are no picture headers located between a target video frame picture header 916 and video packet header 911, the number of picture headers would be "0."

The method now proceeds to a step 952 where the video packet time stamp in "system clocks per frame" is read from the packet header 911 of FIG. 7. The video packet time stamp in "system clocks per frame" may be determined using any appropriate video frame frequency. Using an exemplary frame frequency of 30 frames per second, system clocks per frame may be determined in the following table:

TABLE 3

SYSTEM CLOCKS PER FRAME $$\frac{90{,}000 \text{ (system clocks/second)}}{30 \text{ (frames/second)}} = \frac{3{,}000}{\text{(system clocks/frame)}}$$

The method now proceeds to a step 954 where the "system clocks per video frame" (i.e., 3,000) is multiplied by the number of picture headers located between the target video frame picture header 916 and video packet header 911. As determined in step 950, there are two "2" picture headers in this example. Therefore, 3,000 system clocks per frame are multiplied by 2 frames to arrive at 6,000 system clocks. Now, the clocks for the packet time stamp are added to the 6,000 system clocks to produce the location of the target video frame picture header 916 in system clocks. At this point the seeker has determined where the target video frame 918 lies in terms of system clocks within the exemplary file 900 of FIG. 7.

On the other hand, if it is determined in step 950 that there are no picture headers located between the target video frame picture header 916 and the video packet header 911, 3,000 system clocks per frame will be multiplied by "0" frames to arrive at zero system clocks. Accordingly, the system clocks for the target video frame picture header 916 will only be the system clocks for the "packet time stamp" itself. At this point, the seeker has determined where the target video frame 918 lies in terms of system clocks within the exemplary file 900 of FIG. 7 for a special case where there are no picture headers lying between the packet header 911 and the target video frame picture header 916.

Once the location for the target video frame 918 has been determined in system clocks, the method proceeds to a step 956 where the determined total system clocks are saved in temporary memory. Alternatively, a suitable pointer may be used to reference the location of the target frame in system clocks. The method now proceeds to a step 958 where an audio packet containing an audio frame closest in system clocks to the target video frame 918 is identified. By way of example, the closest audio packet will preferably be the most preceding audio packet, which in the example of FIG. 7 is audio packet 902. However, in other embodiments the closest audio frame may be in a succeeding audio packet, such as audio packet 910.

Once the appropriate audio packet has been identified in step 958, the method proceeds to a step 960 where a seek is performed within the appropriate audio packet in substantially the same manner as described above for the video packet. Of course, the particular MPEG audio standards, audio frame rates and audio bit rates will be used to derive the appropriate location of audio frames within a selected audio packet. At this point, the method for performing an "audio-to-video" seek is done.

The invention employs various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 9:
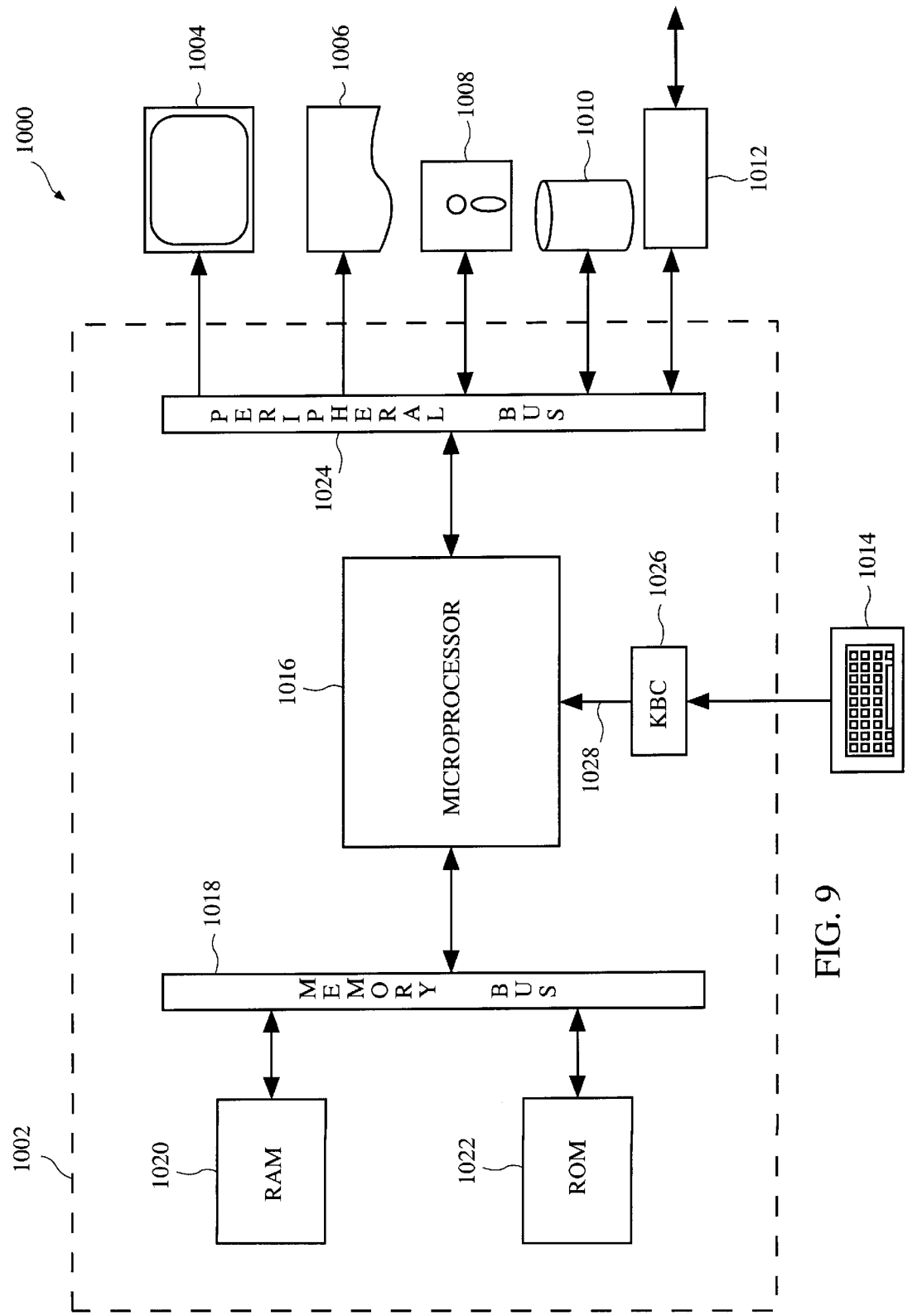
FIG. 9 is a block diagram of an exemplary computer system for carrying out the audiovisual editing and seeking steps in accordance with one embodiment of the present invention.

FIG. 9 is a block diagram of an exemplary computer system 1000 for carrying out the processing according to the invention. The computer system 1000 includes a digital computer 1002, a display screen (or monitor) 1004, a printer 1006, a floppy disk drive 1008, a hard disk drive 1010, a network interface 1012, and a keyboard 1014. The digital computer 1002 includes a microprocessor 1016, a memory bus 1018, random access memory (RAM) 1020, read only memory (ROM) 1022, a peripheral bus 1024, and a keyboard controller 1026. The digital computer 1000 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 1016 is a general purpose digital processor which controls the operation of the computer system 1000. The microprocessor 1016 can be a single-chip processor or can be implemented with multiple components. Using instructions retrieved from memory, the microprocessor 1016 controls the reception and manipulation of input data and the output and display of data on output devices. According to the invention, a particular function of microprocessor 1016 is to assist in the processing associated with seeking within MPEG video and audio streams.

The memory bus 1018 is used by the microprocessor 1016 to access the RAM 1020 and the ROM 1022. The RAM 1020 is used by the microprocessor 1016 as a general storage area and as scratch-pad memory, and can also be used to store input data and processed data. The ROM 1022 can be used to store instructions or program code followed by the microprocessor 1016 as well as other data.

The peripheral bus 1024 is used to access the input, output, and storage devices used by the digital computer 1002. In the described embodiment, these devices include the display screen 1004, the printer device 1006, the floppy disk drive 1008, the hard disk drive 1010, and the network interface 1012. The keyboard controller 1026 is used to receive input from keyboard 1014 and send decoded symbols for each pressed key to microprocessor 1016 over bus 1028.

The display screen 1004 is an output device that displays images of data provided by the microprocessor 1016 via the peripheral bus 1024 or provided by other components in the computer system 1000. The printer device 1006 when operating as a printer provides an image on a sheet of paper or a similar surface. Other output devices such as a plotter, typesetter, etc. can be used in place of, or in addition to, the printer device 1006.

The floppy disk drive 1008 and the hard disk drive 1010 can be used to store various types of data. The floppy disk drive 1008 facilitates transporting such data to other computer systems, and hard disk drive 1010 permits fast access to large amounts of stored data.

The microprocessor 1016 together with an operating system operate to execute computer code and produce and use data. The computer code and data may reside on the RAM 1020, the ROM 1022, or the hard disk drive 1020. The computer code and data could also reside on a removable program medium and loaded or installed onto the computer system 1000 when needed. Removable program mediums include, for example, CD-ROM, PC-CARD, floppy disk and magnetic tape.

The network interface 1012 is used to send and receive data over a network connected to other computer systems. An interface card or similar device and appropriate software implemented by the microprocessor 1016 can be used to connect the computer system 1000 to an existing network and transfer data according to standard protocols.

The keyboard 1014 is used by a user to input commands and other instructions to the computer system 1000. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

The following MPEG audio and video standards described above are hereby incorporated by reference: (1) a document entitled "Generic Coding of Moving Pictures and Associated Audio Information: Video," ISO/IEC 13818-2; (2) a document entitled "Coding of Moving Pictures and Associated Audio for Digital Storage Media at up to about 1.5 MBit/s" (Part 1 System, Part 2 Video, Part 3 Audio) 11171/11172 (1995/1996); and (3) a document entitled "Generic Coding of Moving Pictures and Associated Audio Information" ISO/IEC 13818-3. All above-referenced MPEG standard documents and future MPEG standard documents may be obtained form ISO/IEC Case Postale 56, CH-1211, Geneva 20, Switzerland.

Although the preferred embodiments of the present invention have been described in detail, it should be understood that the present invention may be embodied in many other specific forms without departing from the spirit or scope of the invention. In the described embodiments, a distributed architecture has been described. Such an architecture has a number of advantages, particularly in terms of modularity and ease of introducing new functionalities. By way of example, new functionalities may be created merely by providing an additional "plug-in" operator object which may utilize many of the same component objects, such as the seeker, the decoder, etc. Furthermore, it should be understood that the seeking functions described above may be practiced to seeking and identify target frames within audio-visual files defined by standards other than MPEG.

While such a described architecture is believed to work particularly well, it should be appreciated that similar functionalities can be accomplished using other architectures as well. Therefore, the present examples and embodiments are to be considered as illustrative and not restrictive, and the invention is not to be limited to the details given herein, but may be modified within the scope and equivalence of the appended claims.

What is claimed is:

1. A method for performing rapid seeks to a target video frame within an audiovisual file, comprising:

determining an estimated position of the target video frame within the audiovisual file;

subtracting an predetermined number of seconds from the estimated position to produce an estimated temporal position in the audiovisual file; and jumping to the estimated temporal position within a current group of pictures, such that the current group of pictures is positioned at least one group of pictures before a target group of pictures that contains the target video frame.

2. A method for performing rapid seeks to a target video frame within an audiovisual file as recited in claim 1, further comprising:

skipping to a next group of pictures that temporally ensues the current group of pictures.

3. A method for performing rapid seeks to a target video frame within an audiovisual file as recited in claim 2, further comprising:

determining whether a frame number derived from a time code of the current group of pictures is greater than a time code associated with the target video frame.

4. A method for performing rapid seeks to a target video frame within an audiovisual file as recited in claim 3, wherein when the frame number derived from the time code of the current group of pictures is greater than the target video frame number, the method includes:

backing up to a previously group of pictures that was read and saved.

5. A method for performing rapid seeks to a target video frame within an audiovisual file as recited in claim 4, further comprising:

locating the target video frame within the previous group of pictures.

6. A method for performing rapid seeks to a target video frame within an audiovisual file as recited in claim 5, wherein the locating includes:

subtracting the frame number derived from a time code of the previous group of pictures from a frame number of the target video frame to generate a target temporal reference frame number.

7. A method for performing rapid seeks to a target video frame within an audiovisual file as recited in claim 6, further comprising:

seeking to the target video frame by moving to the target temporal reference frame within the previous group of pictures.

8. A method for performing rapid seeks to a target video frame within an audiovisual file as recited in claim 2, further comprising:

associating an identified video frame with a closest audio frame to complete an audio-to-video seek.

9. A system for rapidly seeking to a target video frame within an audiovisual file, comprising:

means for determining an estimated position of the target video frame within the audiovisual file;

means for subtracting an predetermined number of seconds from the estimated position to produce an estimated temporal position in the audiovisual file; and means for jumping to the estimated temporal position within a current group of pictures, such that the current group of pictures is positioned at least one group of pictures before a target group of pictures that contains the target video frame.

10. A system for rapidly seeking to a target video frame within an audiovisual file as recited in claim 9, further comprising:

means for jumping to a next group of pictures that temporally ensues the current group of pictures.

11. A system for rapidly seeking to a target video frame within an audiovisual file as recited in claim 10, further comprising:

means for determining whether a frame number derived from a time code of the current group of pictures is greater than a time code associated with the target video frame.

12. A system for rapidly seeking to a target video frame within an audiovisual file as recited in claim 11, wherein when the frame number derived from the time code of the current group of pictures is greater than the target video frame number, the method includes:

means for backing-up to a previously group of pictures that was read and saved.

13. A system for rapidly seeking to a target video frame within an audiovisual file as recited in claim 12, further comprising:

means for locating the target video frame within the previous group of pictures.

14. A system for rapidly seeking to a target video frame within an audiovisual file as recited in claim 13, wherein the locating includes:

means for subtracting the frame number derived from a time code of the previous group of pictures from a frame number of the target video frame to generate a target temporal reference frame number.

15. A system for rapidly seeking to a target video frame within an audiovisual file as recited in claim 14, further comprising:

means for seeking to the target video frame by moving to the target temporal reference frame within the previous group of pictures.

* * * * *